No. 683,746. Patented Oct. 1, 1901.
C. E. GORANSSON.
GRASS CLIPPER.
(Application filed Oct. 25, 1900.)
(No Model.)
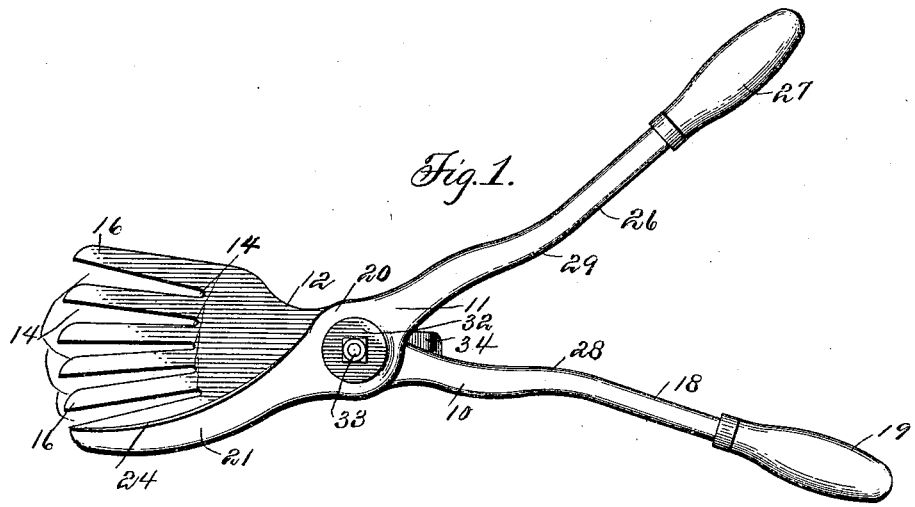
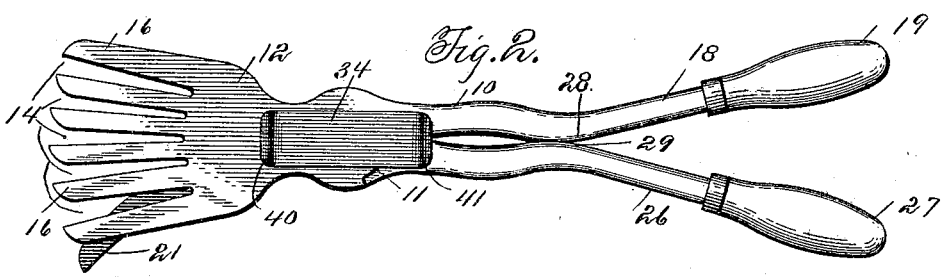
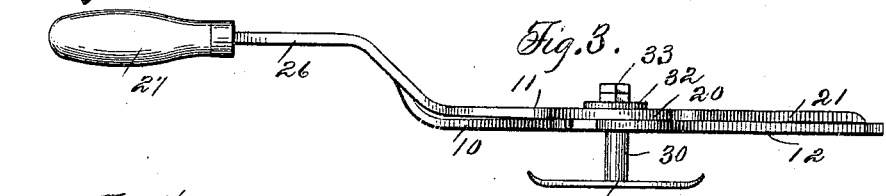
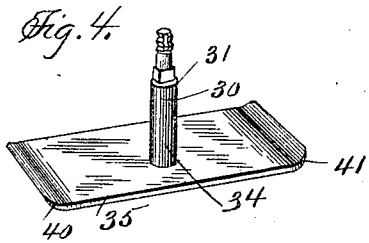
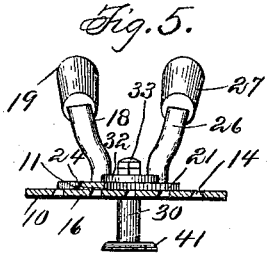
Witnesses
W. E. Chandler
E. A. Ryan.
Inventor
C. E. Goransson.
by Chandler & Chandler
Attorneys

UNITED STATES PATENT OFFICE.

CHARLES E. GORANSSON, OF CHICAGO, ILLINOIS.

GRASS-CLIPPER.

SPECIFICATION forming part of Letters Patent No. 683,746, dated October 1, 1901.

Application filed October 25, 1900. Serial No. 34,294. (No model.)

*To all whom it may concern:*

Be it known that I, CHARLES E. GORANSSON, a citizen of the United States, residing at Chicago, in the county of Cook, State of Illinois, have invented certain new and useful Improvements in Grass-Clippers; and I do hereby declare the following to be a full, clear, and exact description of the invention, such as will enable others skilled in the art to which it appertains to make and use the same.

This invention relates to grass-clippers for trimming the edges of grass plats, although it will be evident from the following description that it may be used for other clipping, the object of the invention being to provide a simple, cheap, and efficient construction for the purpose designed.

In the drawings forming a portion of this specification, and in which like numerals of reference indicate similar parts in the several views, Figure 1 is a top plan view of the clippers with the blades open. Fig. 2 is a bottom plan view with the blades closed. Fig. 3 is a side elevation with the blades closed. Fig. 4 is a detail perspective view of the shoe. Fig. 5 is a section taken through the blades and transversely thereof to show the cutting edges.

Referring now to the drawings, the clippers comprise two pivoted members 10 and 11, of which the member 10 includes a body portion 12, having its forward portion broadened to form the main blade of the clipper, this broadened portion having longitudinal slots 14 formed in its forward end, resulting in the formation of fingers 16, one side edge of each finger being formed at an acute angle to the upper face thereof to present a cutting edge. These cutting edges are on the corresponding sides of all of the fingers. The longitudinal slots 14 are formed to converge slightly in the direction of their rear ends, as shown, and the backs of the fingers—that is, the sides opposite to the cutting edges—are rounded at their outer ends.

The body portion 12 of the member 10 is formed of a single plate of steel, and the rear portion thereof is reduced laterally to form a handle 18, which is provided with terminal grips 19, the handle portion being bent, as hereinafter described. The second member 11 of the clippers is also formed of a plate of steel and comprises a central body portion 20, which is pivoted upon the member 10 in a manner hereinafter described, and extending from which body portion is a finger 21, which is adapted for movement laterally over the fingers 16, this finger 21 being, in fact, the second blade of the clippers. The finger 21 is arc-shaped, and its concaved side is beveled, as shown, to present a cutting edge 24 to the cutting edges of the fingers 16, the tip of the arc-shaped finger first traversing a finger 16, so that a shearing cut is secured and at the same time the material operated upon is drawn rearwardly of the fingers 16, and escape thereof forwardly from between the fingers 16 is prevented. From the body portion 20 there also extends a handle 26 in a direction opposite to the extension of finger 21, said handle having a grip 27 upon its outer end. The two handle portions are similar and are reversed, said handles being first bowed outwardly, after which they are bent upwardly and rearwardly and at the same time curved outwardly to form abutments 28 and 29, which are adapted for engagement to limit the movement of the handles toward each other. Above the abutments the handles are bent rearwardly and outwardly, as shown, whereby when the abutments are in engagement the grips will be held out of contact and the hands of the operator will not strike.

The body portions 12 and 20 of the two members are perforated to receive a pivot in the form of a stem 30, having an upper reduced portion forming a shoulder 31, the reduced portion being passed through the perforations of the body portions, with the body portion 12 lying against the shoulder 31. A washer 32 is then placed upon the stem above the upper member, and nuts 33 are engaged with the stem to hold the members connected. The lower or body portion 34 of the stem 30 depends below the body portion 12 of member 10, and secured thereto is a shoe 35, which is of steel or other suitable metal and the ends of which are curved upwardly, as shown at 40 and 41, to permit the shoe to slide easily over the ground during the operation of the clippers. The stem of the shoe thus has the double function of pivotally connecting the cutting members and of forming a support for the members from the shoe.

It will of course be understood that in practice various modifications of the specific construction shown may be made and that any suitable materials and proportions may be used for the various parts without departing from the spirit of the invention.

What is claimed is—

1. A clipping device comprising two coöperating members having blade and operating handles, said members having perforations therethrough, and a shoe having upturned ends, said shoe having a central upwardly-directed stem having a reduced upper end engaged with the perforations, and a nut engaged with the extremity of the stem to connect the members pivotally.

2. A clipping device comprising two members pivotally connected and provided with operating-handles, one of the said members having longitudinal rearwardly-converging slots having fingers, cutting edges formed upon the fingers, the second member having an arc-shaped finger having a cutting edge at its concave side, said members having perforations therethrough and a shoe having upturned ends, said shoe having a central upwardly-directed stem having a reduced upper end engaged with the perforations, and a nut engaged with the extremity of the stem to connect the members pivotally.

In testimony whereof I hereunto sign my name, in the presence of two subscribing witnesses, on this 15th day of August, 1900.

CHARLES E. GORANSSON.

Witnesses:
P. HEMPSTEAD,
W. M. HOLLIS.